United States Patent [19]

Goldstein

[11] 4,385,592

[45] May 31, 1983

[54] CANINE CERVICAL BRACE

[76] Inventor: Brad L. Goldstein, 107 7th St., Colorado Springs, Colo. 80906

[21] Appl. No.: 287,517

[22] Filed: Jul. 27, 1981

[51] Int. Cl.³ .................... A01K 15/04; A01K 29/00
[52] U.S. Cl. ..................................... 119/96; 119/143; 54/79
[58] Field of Search ............... 119/96, 143; 54/79; 128/87 R, 133, 134

[56] References Cited

U.S. PATENT DOCUMENTS 3,232,289  2/1966  Zimmerman .................. 128/87 R
4,114,352  9/1978  Horton et al. ................. 119/143 X

FOREIGN PATENT DOCUMENTS 1029346   5/1966  United Kingdom ............. 119/143
1579800  11/1980  United Kingdom ............... 54/79

Primary Examiner—Robert P. Swiatek
Attorney, Agent, or Firm—Richard W. Hanes

[57] ABSTRACT

The present invention relates to a canine cervical brace for immobilizing the neck and thoracic-lumbar regions of a dog following surgery in those regions. More specifically the brace includes an anterior neck restraining sling which is held in position by a pair of bilateral checkrein straps which are secured to a body blanket. The blanket is held in position by an underbelly retaining member which is integral with the blanket at its front portion and secured by girth straps around the body in the chest and abdominal portions.

6 Claims, 3 Drawing Figures

CANINE CERVICAL BRACE

BACKGROUND OF THE INVENTION

Canine surgery and particularly surgery to the cervical spine requires postoperative immobilization which is difficult to achieve with available apparatus. There has been some use made of human knee braces placed around the neck for this purpose but the fit cannot be made precise and neck and head movement is not constrained in the most desirable manner.

The primary objective of the present invention is to provide apparatus for restricting the movement of the neck, head and thoracic vertebrae of a dog following any surgery where immobilization is desirable.

A second object of the invention is to provide a device of the type described which can be easily placed on the animal and adjusted to the fit necessary to properly accomplish the immobilization.

Other objects, features and advantages of the invention will become apparent upon a reading of the following detailed description of a preferred form of the invention taken in conjunction with the accompanying drawings in which.

DETAILED DESCRIPTION

Referring to the figures of the drawings, the cervical neck brace 2 of the present invention includes a generally rectangularly shaped longitudinally stiffened but laterally flexible upper body blanket member 4 adapted to cover the back of the animal and depend down over each side of its body.

Figure 1:
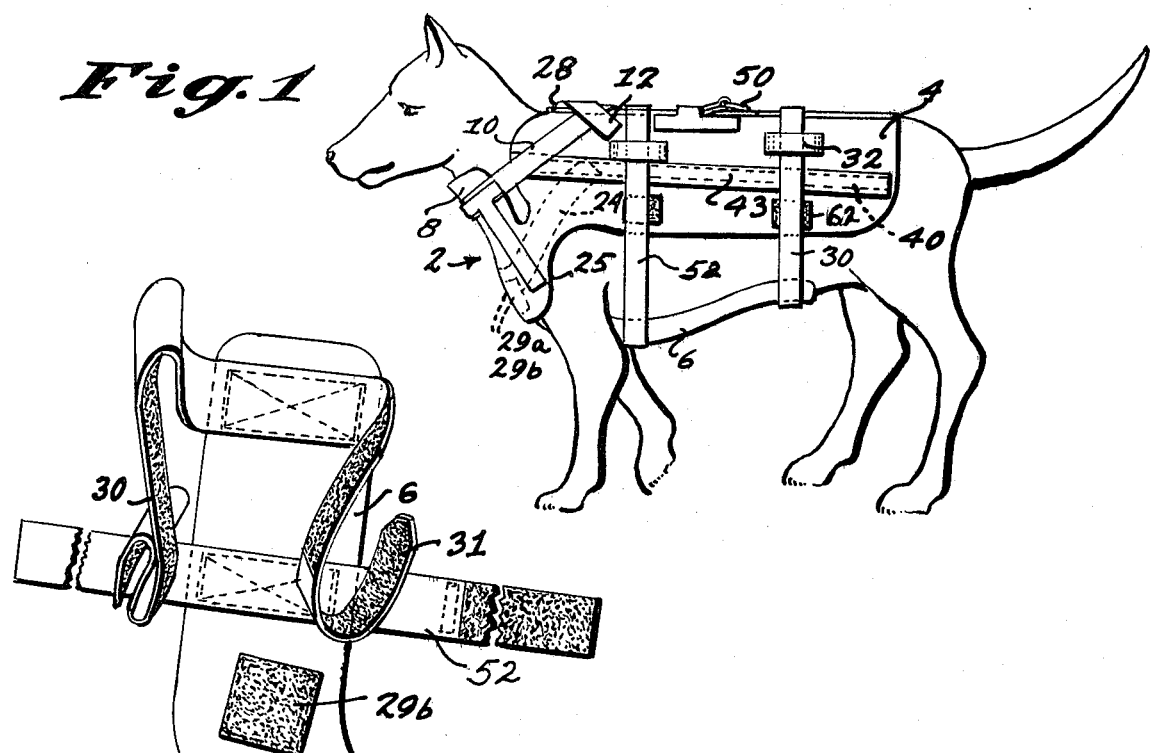
FIG. 1 is a side elevational view of the cervical brace as seen in place on a typical canine subject.
Figure 2:
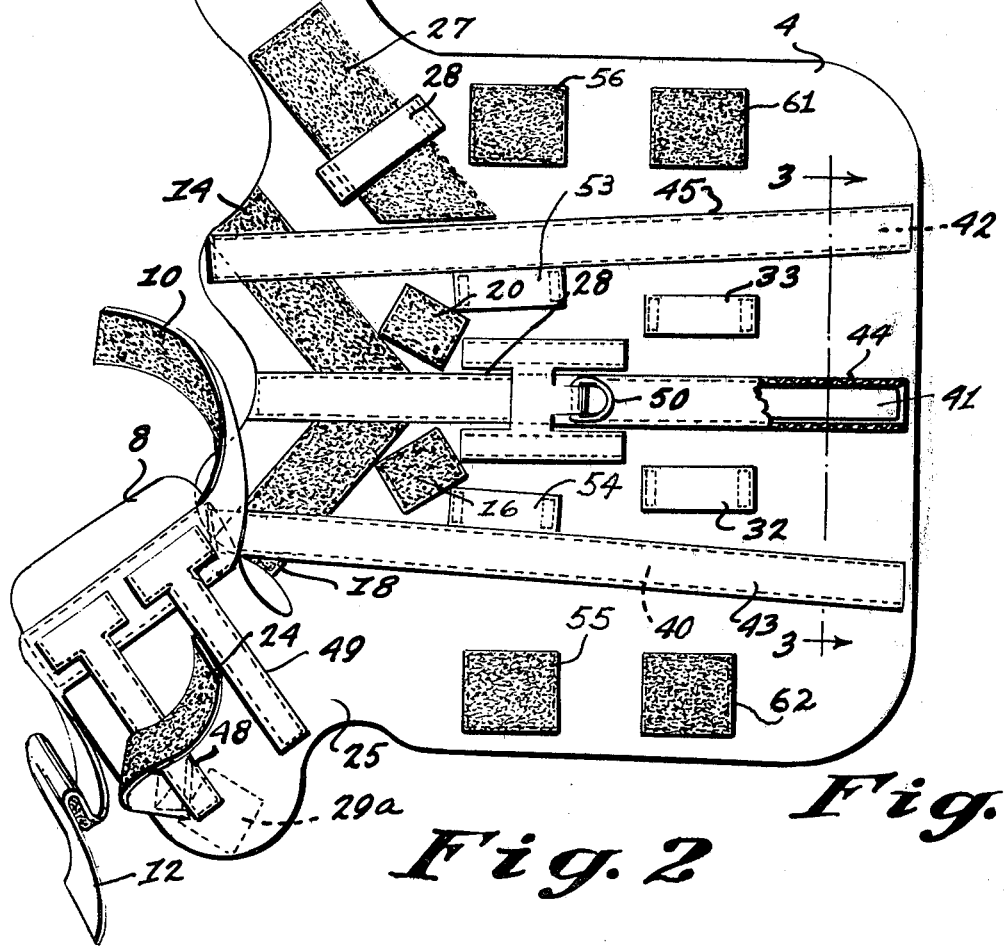
FIG. 2 is a top plan view of the cervical brace.
Figure 3:
FIG. 3 is a cross-sectional view taken along lines 3—3 of FIG. 2.

Integral with the body blanket 4 and extending from its right front corner (as seen in FIG. 2) is a narrowed underbody or belly member 6 which folds down over the right shoulder and extends rearwardly between the animal's front legs so as to lie against the chest and belly.

Extending from the left front corner of the blanket 4 is the neck restraint sling 8 which is directed down across the left shoulder and lies against the anterior portion of the neck and upper chest. The purposes of the rearwardly extending and stiffened body blanket 4 and the belly member 6 is to "splint" the thoracic and lumbar regions and to provide a stabilized anchoring platform to secure the neck restraining sling 8.

To maintain the sling 8 tightly drawn against the anterior neck, a pair of checkrein straps 10 and 12 are fixed to the free end of the sling 8 and are adapted to extend diagonally back across each side of the neck respectively and attach to mating pairs of "Velcro" fasteners 14, 16, 18 and 20 sewn to the top front portion of the blanket 4. Additional rigid bonding of the sling 8 to the body blanket 4 is achieved with a right shoulder strap 24 attached to the lower portion of the sling 8 and adapted to lie against the right shoulder, similar to the integral connection 25 between the blanket and the sling which lies over the left shoulder. The free end of the right shoulder strap is secured to the front right side of the blanket 4 by a "Velcro" fastener 27 lying underneath a belt loop 28. Further securing of the sling 8 is provided by complimentary attaching patches 29a and 29b of "Velcro" on the bottom of the sling 8 and the inner end of the belly member 6. With the checkrein straps cinched tight and secured to the front portion of the back blanket, as described, the dog is prevented from lowering its head or bending its neck with movement that may be harmful to the surgical site.

The purposes of the belly member 6 are twofold. First, the belly member, by being located between the front legs, keeps the body blanket from rotating on the dog's body whereby the restraining sling would move to a position on the side of the neck, which would not serve its proper function. Secondly, the rearward extension of the belly member to the smaller girth of the abdominal section of the dog serves to maintain the restraining sling 8 on the lower and middle portions of the neck by preventing the device from "climbing" to the upper and smaller part of the neck where the checkrein straps would be too loose to be effective.

The belly member 6 is secured to the rear of the body blanket 4 by girth belt bands 30 and 31 which are attached to the rear portion of the belly member and trained through a pair of belt loops 32 and 33 on the top and rear portion of the blanket. The ends of the girth bands 30 and 31 are fastened together by well known "Velcro" techniques or other convenient means, such as a buckle and may also be secured to the lower sides of the blanket 4 by "Velcro" patches 61 and 62.

Further, and in order to maximize the splinting effect of the body blanket on the thoracic and lumbar regions of the spine, a second girth belt 52 is sewn to the belly member 6 at a point just anterior of the front legs. This second belt 52 encircles the body and is disposed beneath belt loops 53 and 54 attached to the blanket 4 and is secured to "Velcro" fasteners 55 and 56, also attached to the blanket 4, along its lower depending side portions.

In order to provide the desirable longitudinal "splinting" rigidity to the entire structure while maintaining reasonable lateral flexibility of body fit for different size animals, the body blanket 4 is stiffened by a plurality of flat metal straps 40, 41 and 42 which are retained by casings 43, 44 and 45, respectively, integral with the top and sides of the blanket. Similarly the sling 8 may advantageously be stiffened and made rigid by a pair of "T" spaced flat metal structures 48 and 49, likewise held in appropriate casings which are sewn or otherwise attached to the sling 8.

A leach loop 50 can be attached to the top of the blanket to serve instead of a neck collar, the stiffeners 40, 41 and 42 providing appropriate structural integrity to keep the leash tension from buckling the blanket.

I claim:

1. A canine cervical brace comprising:
   a generally rectangular laterally flexible and longitudinally stiffened upper body blanket adapted to cover the back and upper side portions of an animal and having:
   an elongated belly member integral with and extending from a front corner portion of the blanket and adapted to be positioned between the front legs of the animal and extend rearwardly over the lower chest and belly;
   girth means attached to the belly member;
   fastening means attached to the girth means for securing the girth means around the body of the animal;
   an elongated anterior neck restraining sling integral with and extending from the other front corner portion of the blanket;

checkrein means attached to the sling; and means for adjustably fastening the free end of the checkrein means to the top front portion of the blanket.

2. The apparatus of claim 1 and further including fastening means attached to the blanket for longitudinally stabilizing the girth means with respect to the blanket.

3. The apparatus of claim 2 wherein the belly member and the said sling are connected to the blanket by narrowed extensions of the blanket which extensions are adapted to cover each shoulder of the animal respectively.

4. The apparatus of claim 3 and further including supplemental restraining means including a strap attached to the sling and adapted to extend over the shoulder opposite to that covered by the said narrow extension interconnecting the sling and the blanket and further including means adjustably interconnecting the strap and the blanket.

5. The apparatus of claim 4 wherein the blanket includes a plurality of longitudinally oriented stiffening means attached to the blanket.

6. The apparatus of claim 5 wherein the sling includes at least one stiffening means attached thereto.

* * * * *